United States Patent Office 3,600,367
Patented Aug. 17, 1971

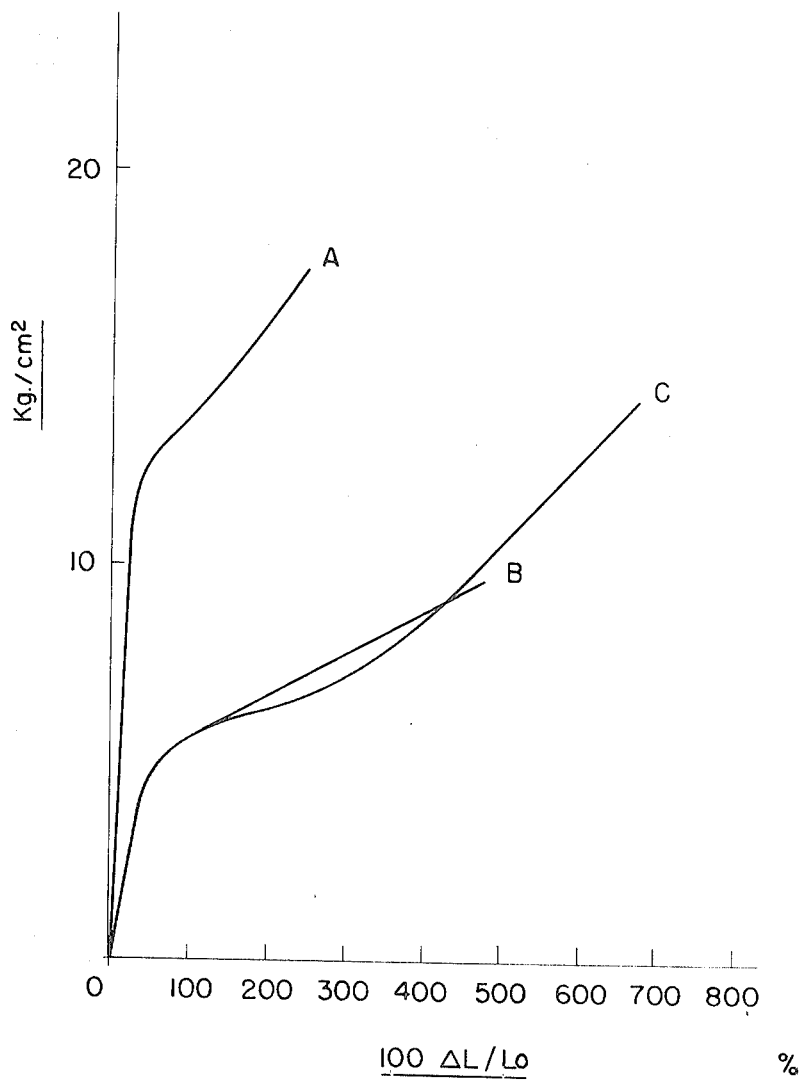

3,600,367
PROCESS AND CATALYSTS WHICH ARE SUPPORTED ON PARTIALLY UNSATURATED MACROMOLECULAR COMPOUNDS FOR THE POLYMERIZATION AND COPOLYMERIZATION OF OLEFINS AND THE RESULTANT POLYMERS AND COPOLYMERS
Andre Delbouille, Brussels, and Jean-Louis Derroitte, Barvaux-sur-Ourthe, Belgium, assignors to Solvay & Cie, Brussels, Belgium
Filed Feb. 21, 1967, Ser. No. 617,598
Claims priority, application Belgium, Feb. 23, 1966, 24,410; May 23, 1966, 28,431; Patent 681,400
Int. Cl. C08f *3/02, 15/04*
U.S. Cl. 260—80.78                    14 Claims

ABSTRACT OF THE DISCLOSURE

Olefins are polymerized and copolymerized in the presence of a catalyst constituted of the reaction product of one or more transition metal compounds, and a macromolecular compound containing carbon-carbon double bonds in its molecule and an activator which is a metal, a hydride or an organo-metallic compound of metals of Groups I to III of the Periodic Table.

BACKGROUND OF THE INVENTION

The present invention relates to a process of polymerization of olefins and of copolymerization of olefins with one another and/or with non-conjugated diolefins, in the presence of new solid catalysts.

It has already been proposed to polymerize ethylene in the presence of a catalyst constituted of an organo-metallic compound and a derivative of a transition metal which are deposited on an inert carrier which may, for example, be preformed polyethylene (Belgian Patent No. 552,550). In this process the catalyst is simply deposited on the surface of the macromolecular compound (i.e., the preformed polyethylene) and may be easily eliminated from it by a physical means such as washing.

A different process would consist in chemically bonding the catalyst to a macromolecular compound having reactive groups. Belgian Patent No. 663,922 is concerned with a process of this type. In this patent, there is described a process for the polymerization and copolymerization of olefins in the presence of a catalyst comprising the reaction product between a transition metal compound and a copolymer of vinyl alcohol containing 1 to 20 mole percent of polymerized vinyl alcohol in its molecule, this product being activated by a metal, a hydride or an organometallic compound of metals of Groups I to III of the Periodic Table. In this case the reactive groups of the macromolecular compound (the macromolecular compound being the copolymer of vinyl alcohol) which react with the transition metal compound are hydroxyl groups.

SUMMARY OF THE INVENTION

The applicants have now found that it is also possible to fix transition metal compounds on macromolecular compounds, through reactive groups which are carbon-carbon double bonds, and that, after activation of the products obtained by metals, hydrides or organometallic compounds of metals of Groups I to III of the Periodic Table, catalysts are produced for the polymerization of olefins which have a number of interesting properties.

The invention comprises effecting the polymerization of olefins and the copolymerization of olefins with one another and/or with non-conjugated diolefins in the presence of a catalyst constituted of the product of the reaction between one or more transition metal compounds and a macromolecular compound including carbon-carbon double bonds in its molecule and an activator which is a metal, a hydride, or an organo-metallic compound of metals of Groups I to III of the Periodic Table.

The unsaturated macromolecular compounds which may be used in the process in accordance with the present invention are preferably those possessing a hydrocarbon main or backbone chain. The type of carbon-carbon double bonds which they have has only a secondary influence on the properties of the catalysts. These double bonds may be situated in the backbone chain or in the lateral chains; they may be conjugated or not.

BRIEF DESCRIPTION OF THE DRAWING

The drawing is a plot of tensile stress versus elongation, curves B and C being for copolymers produced by the use of catalyst systems according to the invention (Examples 7 and 35, respectively) and curve A being for a reference copolymer (comparative Example $R_1$); $L_0$ is the original length of the test specimen and $\Delta L$ is the increase in length of the test specimen from its original length under the tensile stress applied.

DESCRIPTION OF THE PREFERRED EMBODIMENTS

In practice, it is desirable that the unsaturated macromolecular compounds utilized have a relatively high content of double bonds in order to possess a sufficient number of reactive groups. A content of 10 double bonds for each 1,000 carbon atoms is the lower limit under which the quantity of polymer formed in the course of polymerization becomes too low with respect to the amount of catalyst utilized.

More particularly there may be used unsaturated macromolecular compounds produced by polymerization of polyunsaturated monomers since these polymers have at least one carbon-carbon double bond per recurrent unit and consequently a high content of reactive groups.

Examples of polymers of that type are:
Polydienes such as polybutadiene cis-1,4; polybutadiene trans-1,4; polybutadiene-1,2; various polyisoprenes;
Polyalkylene such as polyacetylene and its substitution derivatives and polyphenylacetylene.

Other unsaturated polymers which may be used are those obtained by modification of saturated polymers, e.g. dehydrochlorinated poly(vinyl chloride) or dehydrogenated polyethylene.

Moreover it has been found that the base macromolecular compounds which may be used for preparing the polymerization catalysts of the invention, may be initially free from unsaturation and may be modified with formation of double bonds under the conditions of the reaction with the transition metal compound. In certain favorable cases this reaction of double bonds formation may even be catalyzed by the transition metal compound.

Examples of macromolecular compounds which, under the conditions of reaction with transition metal compounds, lead to the formation of double bonds, are poly(vinyl chloride) by dehydrochlorination, poly(vinyl bromide) by dehydrobromination and poly(vinyl acetate) by loss of acetic acid. The dehydrochlorination of vinyl chloride is indeed catalyzed by certain transition metal compounds such as titanium tetrachloride.

Transition metal compounds which may be used for the preparation of the new catalysts are preferably chosen among the halides, oxyhalides, haloalkoxides, alkoxides and acetylacetones of metals of Groups IV*b*, V*b* and VI*b* of the Periodic Table, and more particularly of titanium, zirconium, vanadium and chromium. Combinations of two or more of these compounds may also be used, and the mixed catalysts obtained have in certain cases activities or properties superior to those based on only one transition metal compound.

The mechanism of the reaction between the transition metal compounds and the unsaturated macromolecular compounds is not known with certainty. It is believed, however, that there is formation of complexes the structure of which would be analogous to that of well known complexes of olefins with certain transition metal compounds, more particularly palladium chloride.

Regardless of the theory of the mechanism of the reaction, it has been found that after reaction, the transition metal compound is chemically bound to the support and cannot be eliminated from it by physical means. Thus, by washing the product of reaction between a transition metal compound and an unsaturated macromolecular compound, e.g. with an inert hydrocarbon solvent in which the transition metal compound is highly soluble, the latter cannot be eliminated. On the other hand, a solvent having a high complexing power, e.g. tetrahydrofuran, and which dissociates the formed complex completely eliminates the transition metal compound, as could be expected.

The reaction between the transition metal compound and the unsaturated macromolecular compound must be effected in the absence of moisture. For example it may be effected by boiling a suspension of the unsaturated macromolecular compound in a hydrocarbon such as hexane, xylene, tetralin or carbon tetrachloride, containing dissolved therein the transition metal compound. If the transition metal compound is a liquid, the reaction may be also effected by directly suspending the unsaturated macromolecular compound in the transition metal compound.

In general the reaction is effected at a temperature between about 30 and 150° C., preferably between about 50 and 130° C. Too low a temperature does not in general allow a sufficient bonding and a too high temperature may lead to the degradation of the macromolecular compound. When a modification of the latter, leading to the unsaturation, is combined with the bonding reaction, this should be taken into account for the selection of the operating temperature.

The product of reaction between the transition metal compound and the macromolecular compound including carbon-carbon double bonds is carefully washed with an anhydrous solvent until there is no trace of the transition metal in the washing solvent. The product must be activated by contacting it with a metal, a hydride or an organometallic compound of Groups I, II and III metals of the Periodic Table. Trialkylaluminums and alkylaluminum halides are particularly well suited as activators.

The activation may be effected immediately before the introduction of the monomers. The catalyst may also be matured for a longer or shorter time at room temperature or at a higher temperature.

The process according to the present invention applies to the polymerization of olefins and to the copolymerization of olefins with one another and/or with diolefins, and particularly to the production of polyethylene, polypropylene, polybutene, ethylene-propylene and ethylene-butadiene copolymers and ethylene-propylene-non-conjugated diene terpolymers.

When applied to the polymerization of ethylene, the catalysts according to the invention permit the production of a polyethylene having a very high linearity and a density greater than 0.96 g./cm.³. The linearity of the polyethylene is such that it contains less than 1 $CH_3$ group per 1,000 carbon atoms. It contains 0.1 to 0.2 vinyl groups per 1,000 carbon atoms and less than 0.05 vinylidene and trans internal double bonds per 1,000 carbon atoms.

The new catalysts are particularly interesting for the production of ethylene-propylene copolymers. Indeed, they permit the copolymerization of ethylene and propylene in the absence of solvent in the mixture of liquified monomers. The products obtained are characterized by an amorphous structure and excellent elastomeric properties, whereas the products prepared under identical conditions, with known catalysts comprising the same organometallic activator and the same transition metal compound but not bound to an unsaturated macromolecular compound, have a crystallinity which is not negligible and are very poor elastomers.

It has been found that the utilization of mixed catalysts, based on compounds of titanium and of vanadium, fixed jointly on the unsaturated macromolecular compound, is particularly advantageous when applied to the copolymerization of ethylene with propylene, as well as for the production of ethylene-propylene-non-conjugated diene terpolymers.

The process according to the present invention indeed permits the copolymerization of non-conjugated dienes with one or more mono-olefins such as ethylene, propylene or butene-1. The non-conjugated dienes which can be used in the process of the invention are of the following categories:

Non-conjugated aliphatic diene such as pentadiene-1, 4; hexadiene-1,4; hexadiene-1,5;

Non-conjugated monocyclic dienes such as 4-vinyl-cyclohexene; 1,3-divinylcyclohexane; cycloheptadiene-1,4; cyclooctadiene-1,5;

Alicyclic dienes having an endocyclic bridge, such as dicyclopentadiene and norbornadiene.

Particularly advantageous terpolymers which are interesting as vulcanizable elastomers and which can be prepared with the aid of the new catalysts are ethylene-propylene-dicyclopentadiene terpolymers and ethylene-propylene-hexadiene-1,4 terpolymers.

The catalysts of the invention are also useful for the copolymerization of olefins with conjugated diolefins.

The polymerization and copolymerization may be carried out according to known techniques: in the gaseous phase, that is to say in the absence of any liquid medium constituting a solvent for the monomer, or in the presence of a dispersion medium in which the monomer is soluble. An inert hydrocarbon which is liquid under the conditions of polymerization, or the monomers themselves, kept in the liquid state under their saturation pressure, may be used as the liquid dispersion medium.

Without being limitative, the following examples will enable the spirit and the objects of the present invention to be better understood.

Examples 1 to 10

(a) Bonding reaction.—5 g. of a polybutadiene having about

|  | Percent |
| --- | --- |
| 1,4 trans units | 80 |
| 1,4 cis units | 10 |
| 1,2 units | 10 | and 50 ml. of $TiCl_4$ are introduced into a cylindrical reactor heated by a double jacket and provided with an agitator and, at the bottom, with a sintered glass plate.

The resultant suspension is heated to the reaction temperature in such a manner that the temperature is increased by 1° C./min. The reaction temperature is maintained for 1 hour.

The mixture is cooled, the solid separated and thoroughly washed with anhydrous hexane until there is no trace of $TiCl_4$ in the washing solvent.

The reaction temperatures and the quantities of bound $TiCl_4$ are given in Table I below.

TABLE I

| Example No. | Reaction temperature, ° C. | $TiCl_4$ bound (g./kg. of reaction product) |
| --- | --- | --- |
| 1 | 60 | 8.31 |
| 2 | 70 | 87.12 |
| 3 | 130 | 194.0 |

(b) Polymerization of ethylene.—A hexane solutiton of triethylaluminum, one of the reaction products as prepared above in (a), and finally 1 l. of hexane (purified on AlCl$_3$ and distilled and dried on alumina) are successively introduced into a 3 l. capacity stainless steel autoclave which has been dried and flushed with nitrogen.

The whole mixture is brought, under agitation, to 80° C. and hydrogen is injected under a pressure of 10 kg./cm.$^2$ and then ethylene is injected, in order to maintain a constant total pressure of 20 kg./cm.$^2$.

After 4 hours the autoclave is opened and the polyethylene produced recovered.

The quantities of reactants used, the experimental conditions and the quantities of polyethylene produced are given in Table II below.

TABLE II

| Example No. | Catalyst | | Activator | | Weight of polyethylene obtained, g. | Activity of catalyst [1] |
|---|---|---|---|---|---|---|
| | No. of preparation | Quantity, g. | Nature | Quantity, g. | | |
| 4 | 2 | 0.807 | Al(C$_2$H$_5$)$_3$ | 1.0 | 94 | 336 |
| 5 | 3 | 0.425 | Al(C$_2$H$_5$)$_3$ | 1.0 | 64 | 194 |
| 6 | 1 | 4.377 | Al(C$_2$H$_5$)$_2$Cl | 1.0 | 16 | 110 |

[1] Grams of polyethylene/grams of TiCl$_4$·hour.

The polyethylene obtained in Example No. 5 was examined by infrared spectroscopy. It contained less than 1 CH$_3$ group, 0.14 vinyl double bonds, 0.04 vinylidene double bonds and less than 0.005 trans internal double bonds per 1,000 carbons atoms.

(c) Copolymerization of ethylene and propylene.—A 100 g./l. hexane solution of triisobutylaluminum, one of the products prepared as in (a) above and 1.116 kg. of propylene are introduced into a 5 l. capacity stainless steel autoclave which has been dried and flushed with a current of propylene.

The system is brought to 40° C. while introducing ethylene so as to maintain a total pressure of 20.65 kg./cm.$^2$. Thus a 10 g.-mole percent solution of ethylene in liquid propylene is prepared.

After 4 hours the unreacted monomers are degassed and the ethylene-propylene copolymer recovered.

The experimental conditions and the data concerning the products obtained are given in Table III below.

TABLE III

| Example No. | Catalyst | | | Al(i-Bu)$_3$, g. | Weight of copolymers obtained, g. | Activity of catalyst [1] | Propylene concentration of copolymer, g-mole percent |
|---|---|---|---|---|---|---|---|
| | No. of preparation example | Total quantity, g. | Quantity of TiCl$_4$, mg. | | | | |
| 7 | 1 | 2.873 | 23.9 | 0.550 | 345 | 3,616 | 37 |
| 8 | 2 | 0.464 | 40.4 | 0.840 | 632 | 3,910 | 40 |
| 9 | 3 | 0.204 | 39.5 | 0.910 | 130 | 823 | 41 |
| R$_1$ | | | 40.0 | 0.920 | 58 | 362 | 29 |
| R$_2$ | | 1.790 | 40.4 | 0.930 | 126 | 780 | 38 |

[1] Grams of copolymer/grams TiCl$_4$·hour.

R$_1$ and R$_2$ are comparative examples effected by way of reference, Example R$_1$ employing a similar quantity of TiCl$_4$ not fixed on a support and Example R$_2$ employing the same quantity of TiCl$_4$ adsorbed on a support not in accordance with the invention, a high-density polyethylene, by contacting of the support for 30 min. with a 10 g./l. hexane solution of TiCl$_4$ heated under reflux. As this polyethylene did not bind the TiCl$_4$, for Test R$_2$ the solid was not washed. Washing the polyethylene having adsorbed the TiCl$_4$ thereon, finally led to a product containing less than 0.5 g./kg. of TiCl$_4$.

In Table III, the comparison of Examples R$_1$ and R$_2$ with Examples 7, 8 and 9 carried out under the same conditions with catalysts according to the present invention clearly shows that the latter manifest fairly superior activities and permit the production of copolymers having a propylene concentration at least equal to or higher than that of the copolymers produced in Tests R$_1$ and R$_2$.

Furthermore, it is observed that the reaction temperature between TiCl$_4$ and the 1,4-trans-polybutadiene, leading to the most active catalysts, lies in the vicinity of 70° C. (Examples 1 and 2).

The tensile mechanical properties of the copolymer of Example 7 were examined and compared with those of the reference copolymer of Example R$_1$, produced with a classical TiCl$_4$/Al(i-Bu)$_3$ catalyst not bound to an unsaturated support. The tension elongation curves of these copolymers are given in the drawing. Curve A is that of the reference copolymer, curve B that of the copolymer produced as in Example 7. These curves clearly show that the copolymer of Example 7 is a very much better elastomer than the reference copolymer. The tension behavior of the latter is nearly that of a plastic material.

(d) Polymerization of propylene (Example 10).—5 ml. of a 200 g./l. trialkylaluminum solution, 2,373 g. of catalyst prepared as in Example 2 above and 1 l. of pure and dry hexane are successively introduced into a 3 l. capacity autoclave which has been dried and flashed with a propylene current. The whole mixture is heated at 40° C. and propylene is injected so as to establish a constant pressure of 5 kg./cm.$^2$.

After 4 hours, the unreacted monomer is degassed and the polypropylene produced filtered. 7 g. of polypropylene is recovered.

Examples 11 to 13

(a) Bonding reaction (Example 11).—8 g. of polybutadiene used in Examples 1 to 3 are suspended in 80 ml. of VOCl$_3$ and 80 mols of heptane. The whole mixture is heated so that the temperature increases by 1° C. per minute up to 80° C. and the suspension is maintained at that temperature for 1 hour. The suspension is cooled and the solid is separated therefrom and thoroughly washed with hexane until there is no trace of VOCl$_3$ in the washing solvent. Then, this solid product is dried under vacuum.

Thus, a catalyst containing 829.6 g. of VOCl$_3$ per kg. is obtained.

(b) Copolymerization of ethylene and propylene (Example 12).—The copolymerization of ethylene is effected under the conditions of Examples 7 to 9, using 0.105 g. of the catalyst prepared above and 2.18 g. of triisobutylaluminum.

After 4 hours, 404 g. of an ethylene-propylene copolymer, containing 35 g.-mole percent of propylene, is obtained. The activity of the catalyst, expressed in g. of copolymer formed per g. of VOCl$_3$ used and per hour, is 1154.

(c) Copolymerization of ethylene with propylene and dicyclopentadiene (Example 13).—400 mg. of triisobutylaluminum as a solution in hexane, 0.129 g. of the catalyst prepared in Example 11, 18.5 g. of dicyclopentadiene, hydrogen with a partial pressure of 0.1 kg./cm.$^2$ and 338 g. of liquid propylene are successively introduced into a 1.5 l. capacity autoclave, which has been dried and flushed with a propylene current.

The autoclave is agitated and brought to 40° C. and then ethylene is gradually introduced so as to obtain a constant total pressure of 19.3 kg./cm.$^2$. The liquid phase contains 7.5 g.-mole of ethylene per 100 g.-mole of ethylene and propylene.

After 4 hr. 30 min. the autoclave is degassed and the product formed is separated and subjected to a stripping by water vapor in order to eliminate dicyclopentadiene. The product is dried under vacuum at 50° C.

Thus, 87 g. of an ethylene-propylene-dicyclopentadiene terpolymer is obtained.

Examples 14 to 16

(a) Bonding reaction (Example 14).—4.8 g. of the polybutadiene used in Examples 1 to 3 and 100 ml. of pure and dry $CCl_4$ are introduced into a 500 ml. capacity three-necked flask, provided with an agitator, a refrigerator and a decantation bulb of 100 ml. capacity. 19.2 g. of $CrO_2Cl_2$ is then added dropwise. An exothermic reaction occurs and a black precipitate is formed. After addition of all of the $CrO_2Cl_2$, the mixture is brought to 60° C. and maintained at that temperature under agitation for one hour.

The whole mixture is cooled and the precipitate washed with $CCl_4$ until elimination of all the chromium which is not fixed on the polybutadiene. The precipitate is then dried under vacuum.

Thus, a catalyst is obtained containing 685.4 g. of $CrO_2Cl_2$ per kg.

(c) Polymerization of ethylene (Example 15).— Ethylene is polymerized under the same conditions as in Examples 4 to 6, by using 0.316 g. of catalyst based on $CrO_2Cl_2$ as prepared above in (a) (Example 14) and 1.0 g. of $Al(C_2H_5)_3$.

After a 4 hour polymerization, 36 g. of polyethylene is obtained.

(d) Copolymerization of ethylene and propylene (Example 16).—The copolymerization is carried out under the conditions of Examples 7 to 9, employing 0.685 g. of the catalyst prepared as in Example 14 and 2.30 g. of $Al(i-Bu)_3$.

After 4 hours 8 g. of copolymer is obtained.

Example 17

10 g. of polybutadiene used in the Examples 1 to 3 is suspended in 65 ml. of an equimolar mixture of $TiCl_4$ and $Ti(OC_4H_9)_4$ generating in situ $TiCl_2(OC_4H_9)_2$. The mixture is brought to 120° C., the rate of heating being 1° C. per minute, and maintained at that temperature for 1 hour.

The solid is separated, washed with hexane and dried, whereby a catalyst is obtained having a concentration of titanium of 7.0 g./kg.

1.52 g. of that catalyst and 0.960 g. of $Al(i-Bu)_3$ are used for a copolymerization test of ethylene and propylene according to the conditions of Examples 7 to 9.

After a 4 hour polymerization, 54 g. of copolymer are recovered.

Examples 18 to 20

(a) Bonding reaction (Example 18).—10.8 g. of 1,4-cis-polybutadiene (cis-4 rubber K 90 from Phillips Petroleum) and 210 ml. of $TiCl_4$ are introduced into a 500 ml. capacity three-necked flask and heated at 130° C. under agitation for 1 hour. A high swelling of the product is observed. After cooling, the solid is separated, ground and very thoroughly washed with dry and pure hexane. After drying under vacuum, a catalyst is obtained containing 190 g. of $TiCl_4$ per kg.

(b) Polymerization of ethylene (Example 19).—Operating under the conditions described in Examples 4 to 6, by the use of 0.765 g. of the catalyst prepared as in Example 18 above and 1.0 g. of triethylaluminum, 184 g. of polyethylene is obtained after 5 hours. The activity of the catalyst, expressed as before, is 254.

(c) Copolymerization of ethylene and propylene (Example 20).—The copolymerization of ethylene and propylene is effected as described in Examples 7 to 9 by using 0.222 g. of the catalyst prepared as in Example 18 and 0.96 g. of triisobutylaluminium. After a 4 hour polymerization, 123 g. of a copolymer is obtained containing 41 g.-mole percent of propylene. The activity of the catalyst is 729 g. of copolymer per hour and per g. of $TiCl_4$ fixed on the polybutadiene support.

Example 21

According to the method described in Example 2 of Belgian Patent 549,554, a polybutadiene-1,2 is prepared by polymerizing butadiene at 25° C. by means of a catalyst comprising chromium acetylacetonate and triethylaluminum.

About 10 g. of this product is reacted at 80° C. with 100 ml. of $TiCl_4$, by operating as described in Examples 1 to 3 and 13.3 g. of a catalyst is obtained, containing 237.6 g. of $TiCl_4$ per kg.

0.212 g. of this catalyst and 0.92 g. of $Al(i-Bu)_3$ are used for carrying out a copolymerization test of ethylene and propylene according to the condition of Examples 7 to 9. 226 g. of copolymer containing 33 g.-mole percent is obtained, which corresponds to a catalyst activity of 1407 g. of copolymer per hour and per g. of $TiCl_4$ fixed.

Example 22

Acetylene was polymerized at 70° C. according to the method described in the Journal of Polymer Science, Part A, vol. 3, pp. 1227–1244 (1965), by means of a catalyst comprising titanium tetrabutylate and triethylaluminum, in a molecular ratio of 1.

3.5 g. of polyacetylene is contacted at 80° C. with 40 ml. of pure $TiCl_4$ according to the method of Examples 1 to 3. After washing and drying, a catalyst containing 257 g. of $TiCl_4$ per kg. is obtained.

0.213 g. of this catalyst and 1.25 g. of triisobutylaluminum are used for the copolymerization of ethylene and propylene according to the conditions described in Examples 7 to 9. After a 4 hour polymerization, 230 g. of a copolymer is obtained, the propylene content of which is 30 g.-mole percent. The catalyst activity, expressed as above, is 1,000.

Example 23

100 ml. of $TiCl_4$ and 15 ml. of $VOCl_3$ are added to 3.5 g. of a polyacetylene prepared according to the method mentioned in Example 22.

The whole system is brought to 90° C. in 35 min. and maintained at that temperature for 1 hour. It is cooled under agitation, carefully washed with 1 l. of hexane and dried under vacuum. Thus, a catalyst is obtained on the macromolecular portion of which are bonded 246 g. of $TiCl_4$ and 599 g. of $VOCl_3$ per kg. of catalyst.

0.174 g. of this catalyst and 0.76 g. of $Al(i-Bu)_3$ are used for the copolymerization of ethylene, propylene and dicyclopentadiene, according to the conditions of Example 13. After 4 hours, 151 g. of terpolymer is obtained. This terpolymer is then vulcanized by a sulfur formulation.

Example 24

50 ml. of $TiCl_4$ and 5 g. of poly(vinyl chloride) (Solvic 227) are introduced into a reactor heated by a double jacket and provided, at the bottom, with a sintered glass plate. The suspension is heated at 130° C. and maintained at this temperature for 1 hour. The excess $TiCl_4$ is then eliminated by filtration on the sintered glass plate and the remaining solid is washed some 20 times with anhydrous hexane to eliminate the $TiCl_4$ which is not bound to the polymer.

The solid obtained in this manner contains 123 mg. of $TiCl_4$ per g.

2.820 g. of trisobutylaluminum, dissolved in 10 ml. of hexane, and 236 mg. of the solid obtained as hereabove are introduced into a 1.5 l. capacity stainless steel autoclave which has been dried and flushed with anhydrous nitrogen and then with propylene.

The autoclave is closed, then hydrogen at the partial pressure 0.250 kg./cm.$^2$ and propylene are introduced. The temperature is brought to 40° C. under agitation while introducing ethylene so as to obtain a total pressure of 20.65 kg./cm.$^2$. Thus, a mixture of ethylene and propylene is obtained which contains 0.9 mole of propylene per mole of liquid phase.

The temperature is maintained at 40° C. and the pressure at 20.65 kg./cm.$^2$ for 4 hours. After this time, the agitation and the heating are stopped and the remaining monomers are degassed.

206 g. of an ethylene-propylene copolymer is recovered, which corresponds to a catalytic activity of 1790 g. of copolymer per hour and per g. of TiCl$_4$ used.

Examples 25 to 29

(a) Bonding reaction.—Poly(vinyl chloride) (Solvic 227) is reacted with different transition metal compounds, according to the method described in Examples 1 to 3. The reaction conditions and the characteristics of the catalysts obtained are given in Table IV below.

TABLE IV

| Example No. | Quantity of PVC[1] used, g. | Quantity of TiCl$_4$ used, ml. | Quantity of VOCl$_3$ used ml. | Reaction temperature, °C. | Reaction time, hr. | Chlorine content of PVC[1] after reaction, g./kg. of PVC[1] | Quantity of TiCl$_4$ bound, g./kg. of catalyst | Quantity of VOCl$_3$ fixed, g./kg. of catalyst |
|---|---|---|---|---|---|---|---|---|
| 25 | 10.3 | 102 | | 50 | 1 | 553.6 | 7.1 | |
| 26 | 10.4 | 104 | | 60 | 1 | 522 | 83.2 | |
| 27 | 10.0 | 100 | | 70 | 1 | 513 | 91.0 | |
| 28 | 15.0 | 160 | | 130 | 1 | 512 | 122.8 | |
| 29 | 10.9 | 120 | | 130 | 4 | 465 | 110.9 | |
| 30 | [2]12.2 | 120 | | 130 | 1 | | 312.8 | |
| 31 | 6.9 | | 70 | 120 | 1 | | | 68 |
| 32 | 24.5 | 100 | 29 | 60 | 1 | | 111 | 24 |

[1] Abbreviation for poly(vinyl chloride).
[2] For this example a vinyl chloride-vinyl acetate copolymer containing 10% vinyl acetate was substituted for the poly(vinyl chloride) (Solvic 227).

The data of Table IV clearly show the dehydrochlorination of poly(vinyl chloride), which reaction precedes the bonding of the transition element compounds. Indeed, the chlorine concentration of the poly(vinyl chloride) decreases the higher the reaction temperature and the longer the reaction time. A certain parallelism between the degree of dehydrochlorination of the poly(vinyl chloride) and the quantity of bound transition metal is observed.

(b) Polymerization of ethylene (Example 33).—By the use of 0.956 g. of the catalyst prepared as in Example 26 and 10 g. of tripropylaluminum, ethylene was polymerized under the conditions of Examples 4 to 6. After a 4 hour reaction, 29 g. of polyethylene is obtained.

(c) Copolymerization of ethylene and propylene (Examples 34 to 38).—Under the conditions of Examples 7 to 9, a series of ethylene and propylene copolymerization tests was carried out. The experimentational conditions and the characteristics of the products are given in Table V below.

TABLE V

| Example No. | Preparation example | Catalyst total quantity, g. | Quantity of TiCl$_4$, mg. | Al(i-Bu)$_3$, g. | Weight of copolymer obtained, g. | Activity of catalyst[1] | Propylene content of copolymer, g.-mole percent |
|---|---|---|---|---|---|---|---|
| 34 | 25 | 2.863 | 20.32 | 0.470 | 119 | 1,464 | 33 |
| 35 | 26 | 0.239 | 19.9 | 0.460 | 494 | 6,206 | 38 |
| 36 | 27 | 0.232 | 21.1 | 0.480 | 335 | 3,970 | 34 |
| 37 | 30 | 0.125 | 39.1 | 0.900 | 485 | 3,100 | 33 |
| 38 | 31 | 0.502 | 34.1 | 0.790 | 107 | 784 | 31 |

[1] Grams of copolymer/grams TiCl$_3$·hour.

A comparison of the results of Examples 34 to 37 with those of comparative examples R$_1$ and R$_2$ given in Table III clearly shows a significant activity increase which is due to the fact that the transition metal compounds are bound to the macromolecular compounds. Example 38, which shows a weaker activity, was carried out with a catalyst based on vanadium.

Curve C of the drawing shows the tensile behavior of the product prepared in Example 35 and clearly shows that it is a good elastomer.

(d) Copolymerization of ethylene with propylene and dicyclopentadiene (Example 39).—By the use of 0.669, g. of the catalyst prepared in Example 32 and 0.920 g. of Al(i-Bu)$_3$, an ethylene-propylene-dicyclopentadiene terpolymer preparation test was carried out under the conditions specified in Example 13. After 105 minutes, 97 g. of a sulfur-vulcanizable terpolymer was obtained.

Example 40

A copolymerization test of ethylene and propylene was carried out under the conditions specified in Example 24, but by the use of 700 mg. of a catalytic solid obtained from poly(vinyl chloride) (Solvic 239) and containing 45 mg. of TiCl$_4$ per g. 190 g. of copolymer was obtained corresponding to a catalytic activity of 1530 g. of copolymer per hour and per g. of TiCl$_4$ used.

The particlular embodiments disclosed herein are intended to be illustrative rather than restrictive.

What we claim and desire to secure by Letters Patent is:

1. A process for the polymerization of ethylene and the copolymerization of ethylene with olefins having a terminal double bond and with diolefins, comprising carrying out said polymerization and copolymerization of ethylene in the presence of a catalyst comprising the solid compound formed by first reacting in a liquid medium in the absence of moisture at least one compound of a transition metal of Groups IV$b$, V$b$, and VI$b$ of the Periodic Table with a macromolecular compound containing at least 10 carbon-carbon double bonds for each 1,000 carbon atoms in its molecule and then washing the resultant solid product with an anhydrous inert organic solvent which dissolves the unreacted transition metal compound, said macromolecular compounds being reacted while in suspension in said liquid medium, said liquid medium being selected from a solution of said transition metal compound in an inert organic solvent having a complexing power insufficient to dissociate the solid transition metal macromolecular complex and said transition metal compound when said transition metal compound is a liquid and an activator selected from the group consisting of hydrides and organometallic compounds of metals of Groups I to III of the Periodic Table.

2. A process according to claim 1, in which the macromolecular compound containing carbon-carbon double bonds in its molecule is formed from a macromolecule selected from the group consisting of polymers of vinyl halides, polymers of vinyl carboxylates and vinyl halide-vinyl carboxylate copolymers by dehydrohalogenation, decarboxylation or a combination thereof in the presence of said transition metal compound and in which the resulting solid compound is washed before being contacted with said olefins.

3. A process according to claim 1 in which said macromolecular compound has a hydrocarbon backbone.

4. A process according to claim 1, in which the macromolecular compound containing carbon-carbon double bonds in its molecules is a polymer of an alkyne.

5. A process according to claim 1, in which ethylene and propylene are copolymerized.

6. A process according to claim 1, in which ethylene, propylene and a non-conjugated diene are copolymerized.

7. A process according to claim 1, in which the macromolecular compound containing carbon-carbon double bonds in its molecules is an alkadiene polymer.

8. A process according to claim 1, in which the transition metal compound is selected from the group consisting of the halides, the oxyhalides, the haloalkoxides, the alkoxides and the acetylacetonates of the metals of Groups IV$b$, V$b$ and VI$b$ of the Periodic Table.

9. A process according to claim 1, in which the activator is selected from the group consisting of trialkylaluminums and alkylaluminum halides.

10. Process according to claim 1 in which the transition metal is selected from at least one member of the group consisting of titanium, zirconium, vanadium and chromium.

11. In a catalyst, the element constituting the solid product obtained by reacting in a liquid medium in the absence of moisture a transition metal compound selected from the group consisting of halides, haloalkoxides, alkoxides and acetylacetonates of the metals of Groups IV$b$, V$b$ and VI$b$ of the Periodic Table and a macromolecular compound containing at least 10 carbon-carbon double bonds for each 1,000 carbon atoms in its molecules, said macromolecular compounds being reacted while in suspension in said liquid medium, said liquid medium being selected from the group consisting of a solution of said transition metal compound in an inert organic solvent having a complexing power insufficient to dissociate the solid transition metal macromolecular complex or said transition metal compound when said transition metal compound is liquid whereby said transition metal compound is chemically bound to said macromolecular compound and washing the resultant solid product with an anhydrous inert organic solvent which dissolves the transition, metal compound.

12. A catalyst comprising the catalyst element of claim 11 in combination with an activator selected from the group consisting of metals, hydrides and organometallic compounds of metals of Groups I to III of the Periodic Table.

13. A method for preparing a catalyst component which comprises reacting in a liquid medium and in the absence of moisture at least one compound of a transition metal of Groups IV, V$b$ and IV$b$ of the Periodic Table with a macromolecular compound selected from the group consisting of a macromolecular compound containing at least 10 carbon-carbon double bonds for each 1,000 carbon atoms in its molecule and a macromolecular compound selected from the group consisting of polymers of vinyl halides, polymers of vinyl carboxylates and vinyl halide-vinyl carboxylate copolymers which is modified by dehydrohalogenation, decarboxylation or a combination thereof with the formation of carbon-carbon double bonds upon reaction with said transition metal compound, said macromolecular compounds being reacted while in suspension in said liquid medium, said liquid medium being selected from the group consisting of a solution of said transition metal compound in an inert organic solvent having a complexing power insufficient to dissociate the solid transition metal macromolecular complex, or said transition metal compound when said transition metal compound is liquid and washing the resultant solid product with an anhydrous inert organic solvent which dissolves the unreacted transition metal compound.

14. A method for preparing a catalyst according to claim 13, in which said macromolecular compound is selected from the group consisting of unsaturated hydrocarbon, poly(vinyl chloride), poly(vinyl bromide) and poly(vinyl acetate).

References Cited
UNITED STATES PATENTS

| | | | |
|---|---|---|---|
| 2,936,302 | 5/1960 | Jones | 260—93.7 |
| 3,022,283 | 2/1962 | Wicklatz | 260—93.7 |
| 3,340,244 | 9/1967 | Coover et al. | 260—93.7 |
| 3,472,823 | 10/1969 | Van Den Berg | 260—80.78 |

JAMES A. SEIDLECK, Primary Examiner

R. S. BENJAMIN, Assistant Examiner

U.S. Cl. X.R.

260—94.9, 88.2; 252—429, 431